UNITED STATES PATENT OFFICE.

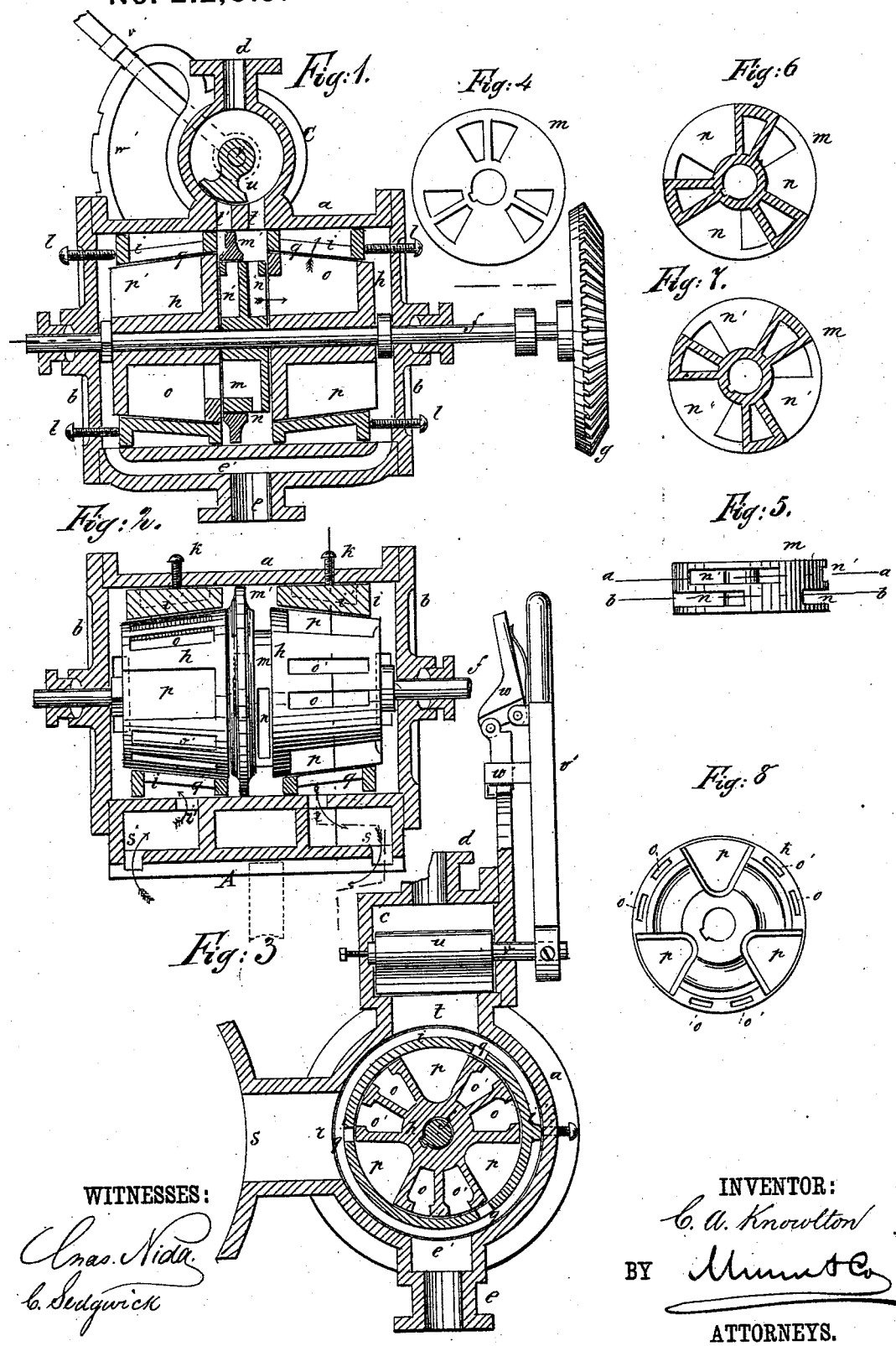

CHARLES A. KNOWLTON, OF KANKAKEE, ILLINOIS.

IMPROVEMENT IN VALVE-GEARS FOR STEAM-ENGINES.

Specification forming part of Letters Patent No. 212,019, dated February 4, 1879; application filed September 13, 1878.

*To all whom it may concern:*

Be it known that I, CHARLES ALBERT KNOWLTON, of Kankakee, in the county of Kankakee and State of Illinois, have invented a new and Improved Valve-Gear for Steam-Engines, of which the following is a specification:

My invention relates to rotary valves for steam-engines and means for reversing the engine; and consists in two cylindrical valves in a valve-chamber and upon a stem or shaft that is revolved by suitable connections to the engine.

The valves are made with a plurality of ports and with tapering surfaces, so that they may be set up to compensate for wear. The reversing-gear consists of a gate at the side of the steam-chest, which is operated by a lever from the outside to open either one of the two ports, according to which side of the piston the steam is to be admitted, and the steam shifts a reversing-ring to uncover one set of ports and close the other.

In the accompanying drawings, Figure 1 is a vertical longitudinal section through the valve-chamber of my improved valve-gear. Fig. 2 is a sectional plan of the chamber with the valves in elevation. Fig. 3 is a cross-section. The other figures are detail views, and are separately referred to.

Similar letters of reference indicate corresponding parts.

The valve-chamber is in the form of a cylinder, $a$, having heads $b\ b$. At one side of the cylinder $a$ is a small cylindrical steam-chest, $c$, into which the live steam enters by the pipe $d$. At the opposite side of the cylinder $a$ is the exhaust-pipe $e$.

$f$ is a shaft running through the cylinder $a$ lengthwise, and passing through stuffing-boxes in the heads $b$. $g$ is a bevel-gear keyed to the end of the shaft $f$, and intended to mesh with a similar gear driven by the engine, so that the valve-shaft $f$ will make one revolution to every three revolutions of the engine-shaft. $h\ h$ are tapering cylindrical valves keyed to shaft $f$. $i\ i$ are rings held to the cylinder $a$ by screws $k\ k$, Fig. 2, and forming seats for the valves $h$. The valves $h$ taper from the center toward the end of cylinder $a$, and the rings $i$ correspond with and compensate for wear.

The seats $i$ may be set up by screws $l$ passing through the heads of the cylinder.

$m$ is a ring upon the shaft $f$, between the inner ends of valves $h\ h$. It is provided with radial mortises $n\ n'$, forming ports, the said ports $n$ being in two lines and communicating with the ports in the valves $h$, as hereinafter described.

The valves $h$ are similar in construction, and the arrangement of the ports in both will be understood from the description of one.

Each valve $h$ is provided with six radial mortises, forming ports, arranged in groups of two, as seen in Figs. 2 and 3, and marked $o\ o'$.

The space between each two ports $o\ o'$ is cut out to form exhaust-ports $p$, that communicate with the space in the cylinder $a$, between head $b$ and valve $h$.

The ports $o$ communicate with the ports $n$ in the ring $m$, and the ports $o'$ communicate with the ports $n'$ in ring $m$. The ring $i$, forming the valve-seat, is formed with an annular groove on its outer surface, so that there is a space between the cylinder $a$ and ring $i$, which communicates with the ports $o\ o'$ and exhaust-ports $p$ in succession by the transverse openings $q$ in the ring $i$. (See Fig. 3.)

There are three openings, $q$, in the ring $i$, equidistant from each other.

The space around the valve-seat $i$, between that and cylinder $a$, is closed at one point by a partition, $i'$.

$r\ r'$ are passages through the side of the cylinder $a$, opening into the space behind each valve-seat ring $i$, and communicating, respectively, with the passages $s\ s'$ at the opposite ends of the engine-cylinder, a portion of which is represented at A.

The exhaust-pipe $e$ communicates with a passage, $e'$, formed at the bottom side of cylinder $a$, (see Fig. 1,) which passage $e'$ opens into cylinder $a$, between the head $b$ and valve $h$ at each end.

The steam-chest $c$ is provided with two passages, $t\ t'$, which admit the live steam to the ports $n\ n'$ of the ring $m$. The passages $t\ t'$ are opened or closed by a reversing-valve, $u$, that is in the form of a segment of a cylinder, upon a central axis, $v$, that is operated from the outside by a lever, $v'$, to close the passages $t\ t'$, or either one of them, according to the direction in which the engine-piston is to be driven. The lever $v'$ has a thumb-latch, $w$, which engages with notches in a segment, $w'$, to hold the lever $v'$ and valve $u$ in either of the three positions in which it is to be placed.

The steam is caused to enter either of the ports $n$ $n'$, according to the position of the valve $u$, and the ports, $n$ or $n'$, not in use are closed by a ring, $m'$, that fits loosely around the ring $m$, which ring $m'$ is moved by the steam to cover one set of ports and open the other, according as to which passage, $t$ or $t'$, the steam enters.

The rings $m$ and arrangement therein of the ports $n$ $n'$, and the passages connecting with the ports $o$ $o'$ of the valves $h$, are shown in the detail Figs. 4, 5, 6, and 7. Fig. 5 is an edge view of ring $m'$; Fig. 6, a section at line $b$ $b$, and Fig. 7 a section at line $a$ $a$. Fig. 8 is an end view of one valve, $h$, looking at the smaller end.

The operations of the valve mechanism above described, in connection with a single engine, are as follows: It is to be understood that the valves $h$ are secured upon the shaft $f$ in such relative position to each other and the valve-seats $i$ that when the steam is entering by the ports $n$ into ports $o$ of one valve $h$ the ports $o$ of the other valve $h$ are covered by the ring-seat $i$, and also, as shown in the drawing, the steam will be cut off at half-stroke; but the exhaust will remain open until the end of the stroke.

The first action of the steam will be to drive the ring $m'$ over the ports $n'$ and open ports $n$, supposing valve $u$ to have been shifted to cover passage $t'$ and open $t$. The steam then goes by ports $o$, openings $q$ in ring $i$, and openings $r$ and $s$, into engine-cylinder A at one end, as shown by the arrows. The rotation of the valves $h$ will close the ports $o$ at half-stroke, and when the stroke is finished the exhaust-ports $p$ will coincide with the opening $q$ in ring $i$, and at the same moment the ports $o$ in the other valve $h$ will be opened to admit steam to drive the piston in the opposite direction.

If the valve $u$ be changed to open the passage $t'$, the ports $n'$ and $o'$ will operate in a similar manner.

The construction of the parts may be modified, so that the steam will cut off at any point, and the exhaust remain fully open during the whole stroke. The valves will operate equally as well at high or low speed, and having more than one set of ports, the valve does not need to revolve at high speed.

The valve mechanism described may be used for supplying steam to two cylinders having cranks at right angles.

The valves are balanced. The ports being at opposite sides, the side pressure is equal, and there being three ports opening and closing at once, a rapidity of action is obtained such as is not practically attainable with a single port.

I do not confine myself to the exact details of construction set forth, as they may be varied without departing from my invention. In non-reversible engines the valve-seat ring might be cast in one piece with the valve-chamber $a$, the reverse-rings $m$ $m'$ being omitted and the valves tapered in the opposite direction, and the reversing-ring $m'$ might be operated by a clutch from the outside.

Having thus fully described my invention, I claim as new and desire to secure by Letters Patent—

1. In a steam-engine, a continuous rotary valve having two or more ports opening and closing simultaneously, in combination with the adjustable seats $i$, provided with a plurality of ports, all constructed and arranged as shown, and for the purpose specified.

2. The ring $m'$, in combination with the ring $m$ and valves $h$, substantially as and for the purposes described.

3. The combination and arrangement of the valve $u$, steam-chest $c$, passages $t$ $t'$, and rings $m$ and $m'$, substantially as and for the purposes set forth.

CHARLES ALBERT KNOWLTON.

Witnesses:
CHAS. E. VOSS,
ANDREW S. CUTLER.